United States Patent [19]

Grahn et al.

[11] Patent Number: 5,567,992
[45] Date of Patent: Oct. 22, 1996

[54] ARRANGEMENT FOR A CRUISE CONTROL SYSTEM FOR A MOTOR VEHICLE

[75] Inventors: Micael Grahn; Håkan Tordby, both of Trollhättan, Sweden

[73] Assignee: Saab Automobile Aktiebolag, Sweden

[21] Appl. No.: 338,630

[22] PCT Filed: Apr. 5, 1994

[86] PCT No.: PCT/SE94/00299

§ 371 Date: Nov. 22, 1994

§ 102(e) Date: Nov. 22, 1994

[87] PCT Pub. No.: WO94/22687

PCT Pub. Date: Oct. 13, 1994

[30] Foreign Application Priority Data

Apr. 7, 1993 [SE] Sweden ............................ 9301162

[51] Int. Cl.⁶ .................................................. B60K 31/00
[52] U.S. Cl. ..................... 307/10.1; 180/178; 200/61.54; 364/426.04
[58] Field of Search .................................. 307/9.1, 10.1; 200/61.54; 180/170, 178, 179; 123/361; 290/40 A, 40 R; 364/426.04

[56] References Cited

U.S. PATENT DOCUMENTS

| | | | |
|---|---|---|---|
| 4,219,709 | 8/1980 | Scarbro | 200/61.54 |
| 4,543,456 | 9/1985 | Iwata et al. | 200/61.54 |
| 4,967,357 | 10/1990 | Mimura et al. | 364/426.04 |
| 5,023,792 | 6/1991 | Shioyama | 364/426.04 |
| 5,105,361 | 4/1992 | Senoo et al. | 364/426.04 |
| 5,294,759 | 3/1994 | Krehnovi | 200/61.54 |

FOREIGN PATENT DOCUMENTS 416591   1/1976   Sweden .

*Primary Examiner*—Jonathan Wysocki
*Assistant Examiner*—Richard T. Elms
*Attorney, Agent, or Firm*—Ostrolenk, Faber, Gerb & Soffen, LLP

[57] ABSTRACT

Control unit (1) for a cruise control system for a motor vehicle including at least one manually operated movable switch (4) for operating the cruise control system. The switch (4) has a neutral position (6) and can, when moved away from the neutral position (6) in a first direction, assume a first position (8) in which the switch (4) gives a control unit (21) a signal for temporarily switching off the system without cancellation of set speed. The switch (4) can also, when moved away from the neutral position (6) in the first direction, assume a second position (10) in which the switch (4) conveys signals to the control unit (21) in order to facilitate for the cruise control system to access, in some predetermined manner, a set speed stored in a memory unit situated in the control unit (21), where the second position (10) can only be reached by the switch (4) passing through the first position (8).

16 Claims, 2 Drawing Sheets

ARRANGEMENT FOR A CRUISE CONTROL SYSTEM FOR A MOTOR VEHICLE

BACKGROUND OF THE INVENTION

The present invention refers to an arrangement for a cruise control system for a motor vehicle.

It is becoming increasingly common for various types of motor vehicles to be provided with cruise control systems (constant speed maintenance systems).

The control units which currently exist for such cruise control systems are usually designed to be able to activate a number of predetermined functions such as setting and adopting a desired set speed and switching off with or without cancellation of the setting.

There are both simple solutions which comprise only these basic functions and more advanced designs which allow a number of set speeds to be stored. However, such advanced solutions are often complicated and relatively expensive, involve a number of buttons or controls and often require the operator to be well acquainted with how to achieve the various functions, which is unfortunate from a safety point of view.

In both cases the control unit is designed to activate only these specific functions.

There are at present no cruise control units which are designed to be adaptable to a variety of embodiments whereby a uniform design of control unit can be used, simply by applying different software to it, to adapt the cruise control system to being able to activate the specific functions desired for a particular vehicle.

SUMMARY OF THE INVENTION

The object of the present invention is to create an arrangement for a motor vehicle cruise control system which can easily be adapted to activate alternative functions without impairing safety.

To this end, the arrangement according to the invention is distinguished by an electrical control unit having a memory for storing a set speed; a plurality of input signal lines connected to the control unit, the control unit generating output signals for controlling the cruise control system in response to signals on the input signal lines; a source of power; and a switch connected between the source of power and the input signal lines to selectively connect the source of power to the plurality of input signal lines. The switch has a neutral position, first and second operating positions spaced in a first direction from the neutral position and first and second contact units. The switch includes a moveable contact which is moveable in the first direction from the neutral position to the first and second positions. The first and second contact units and the moveable contact are arranged with the source of power and the input signal lines such that when the moveable contact is in the first position, signals are applied to the input signal lines to cause the output signals from the control unit to temporarily deactivate the cruise control system without cancellation of the set speed and, in the second position, the signals applied to the input signal line result in output signals representative of a predetermined cruise control function being generated. The switch is further structured and arranged such that the second position can only be reached by the moveable contact first passing through the first position, so that the first contact unit applies signals via the input signal lines to the control unit as the moveable contact passes therethrough to temporarily deactivate the cruise control system. This means that whatever function is chosen for the selectable position, the cruise control system is switched off when the function is activated and there is no risk of undesired acceleration.

According to an advantageous embodiment, the switch takes the form of a sliding contact which is urged towards a neutral position by a spring device.

According to a first embodiment, the selectable position corresponds to an ON/OFF function whereby alternate signals respectively activate the cruise control system and switch it off with cancellation of the set speed.

This solution also means that stopping the engine automatically switches off the system, which is thus in the OFF position the next time the cruise control system comes into operation.

Such a solution has further great advantages from the safety point of view and may be extremely advantageous in vehicles which often have different drivers who are not familiar with the system, e.g. hire vehicles.

According to another embodiment, the cruise control system can store a number of different set speeds whereby the selectable position corresponds to a function for accessing another stored set speed and the memory is accessed according to a predetermined sequence. This solution is advantageous in vehicles in which the operator often uses the system.

Further features and advantages of the arrangement according to the invention emerge from the accompanying description and an embodiment example. The description refers to the accompanying drawings in which all the numerical notations denote mutually corresponding items.

DESCRIPTION OF THE PREFERRED EMBODIMENT

Figure 1:
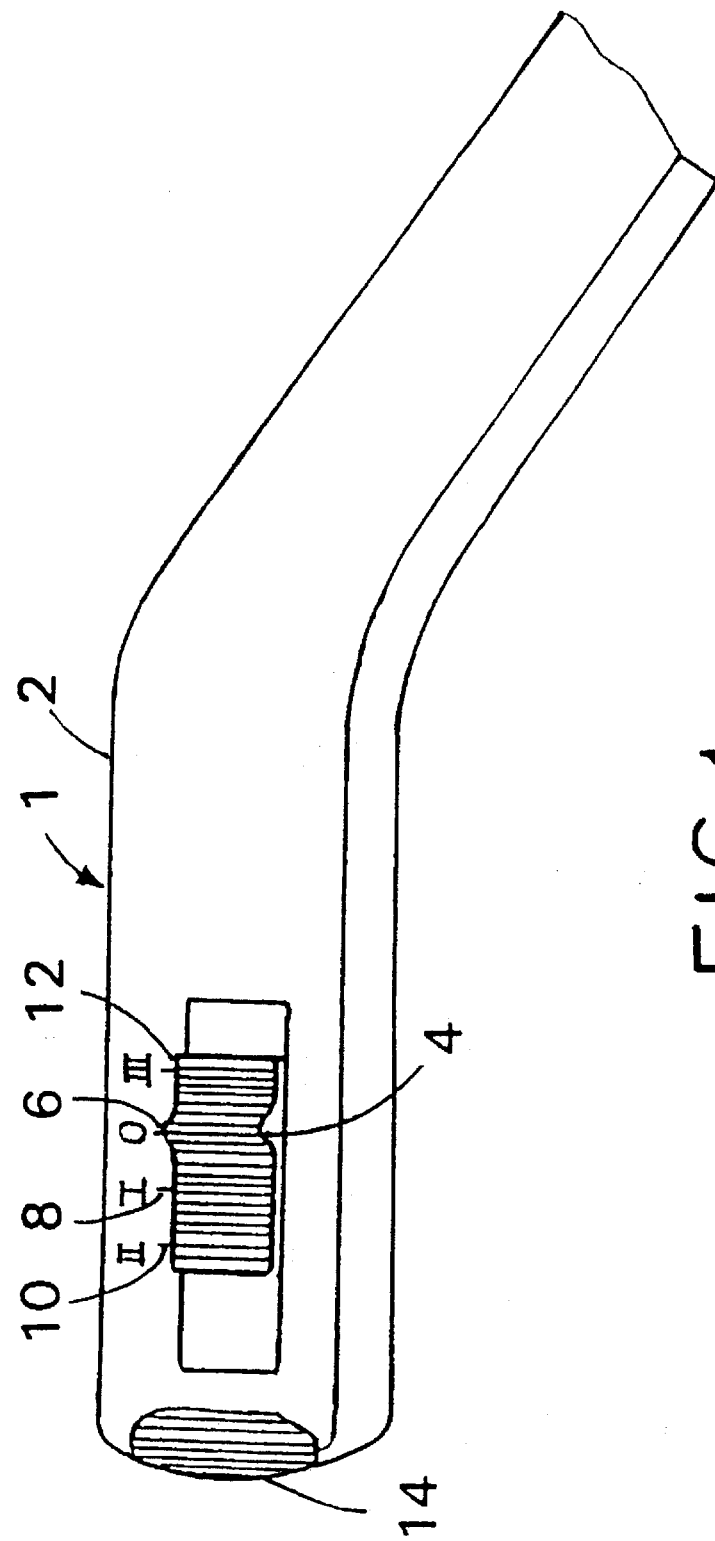
FIG. 1 shows a control unit for a cruise control system situated on a flasher control lever in a motor vehicle.

FIG. 1 shows a control unit 1 for a cruise control system for a motor vehicle, e.g. a private car, situated on a flasher control lever 2 incorporated in the vehicle.

The control unit 1 has a first switch 4 which in the drawings is in a normal position 6. The switch 4 is movable between the normal position 6 and a first and a second position 8, 10 in a first direction from the normal position 6 (to the left in the drawings) and a third position 12 in an opposite direction from the normal position 6 (to the right in the drawings). The switch 4 is here formed as a sliding contact and is urged towards the neutral position 6 by a spring device 7, which means that the first, second and third positions 8, 10. 12 are unstable. There is also a second switch 14 in the form of a spring-back push-button which is movable between an outer stable position 16 and a pressed-in unstable position 18.

Moving the two switches 4, 14 between the various positions produces signals via a number of signal lines 20, 22, 24 (shown in FIG. 2) to a control unit 21 which forms part of the cruise control system and receives certain predetermined functions which are previously known per se and occur in many cruise control systems. In the embodiment example, the signals consist of a three-digit code whereby each signal line 20, 22, 24 can have two signal levels (signal or no signal).

The control unit 21 gives signals via a cluster of lines 25 in a known manner to the engine control system for controlling the drive power and hence the vehicle's speed.

The first position 8 of the sliding contact 4 corresponds to a function for temporarily switching off the cruise control system without cancelling its set speed, this is commonly called a TIP-OFF function, while the third position 12 corresponds to a function for adopting a speed set by the driver in the control unit 21, this is commonly called a RESUME function. It is previously known and commonly the case that control units for cruise control systems have TIP-OFF and RESUME functions situated on mutually opposite sides of the normal position.

In the arrangement according to the invention, the sliding contact 4 also assumes a second position 10 which is situated beyond the first position 8; this position 10 corresponds to a function for accessing a set speed stored in a memory unit 23 situated in the control unit 21 and can only be reached by the sliding contact 4 passing through the first position 8 at which the control unit 21 receives the signal for the TIP-OFF function. The function for this second position 10 may be chosen according to the characteristics desired. This is done by choice of software for the control unit 21.

According to a first embodiment, the second position 10 corresponds to a ON/OFF function whereby alternate signals respectively activate the cruise control system and switch it off with cancellation of set speed.

According to a second embodiment, the control unit 21 can impose a number of different set speeds where the second position 10 corresponds to a function for accessing other set speeds and where the memory is accessed according to a predetermined sequence. This solution requires either that a third switch (not shown here) for the ON/OFF function is situated somewhere else, e.g. on the instrument panel, or that the first signal after the voltage of the control unit 1 has been set produces an ON function.

Various characteristics of the respective embodiments are described later on. The invention thus means that the cruise control system can be adapted to different functions without having to alter the structural design of the control unit 1.

Pressing in the push-button 14 brings in the function for speed setting, this is commonly called the SET function.

Holding the push-button 14 in the pressed-in position 18 gives the control unit a signal to accelerate the vehicle at a predetermined rate until the button 14 is let back to the stable position 16. A decelerating function is correspondingly achieved by holding the sliding contact 4 in the third position 12. Both these functions are also previously known.

Figure 2:
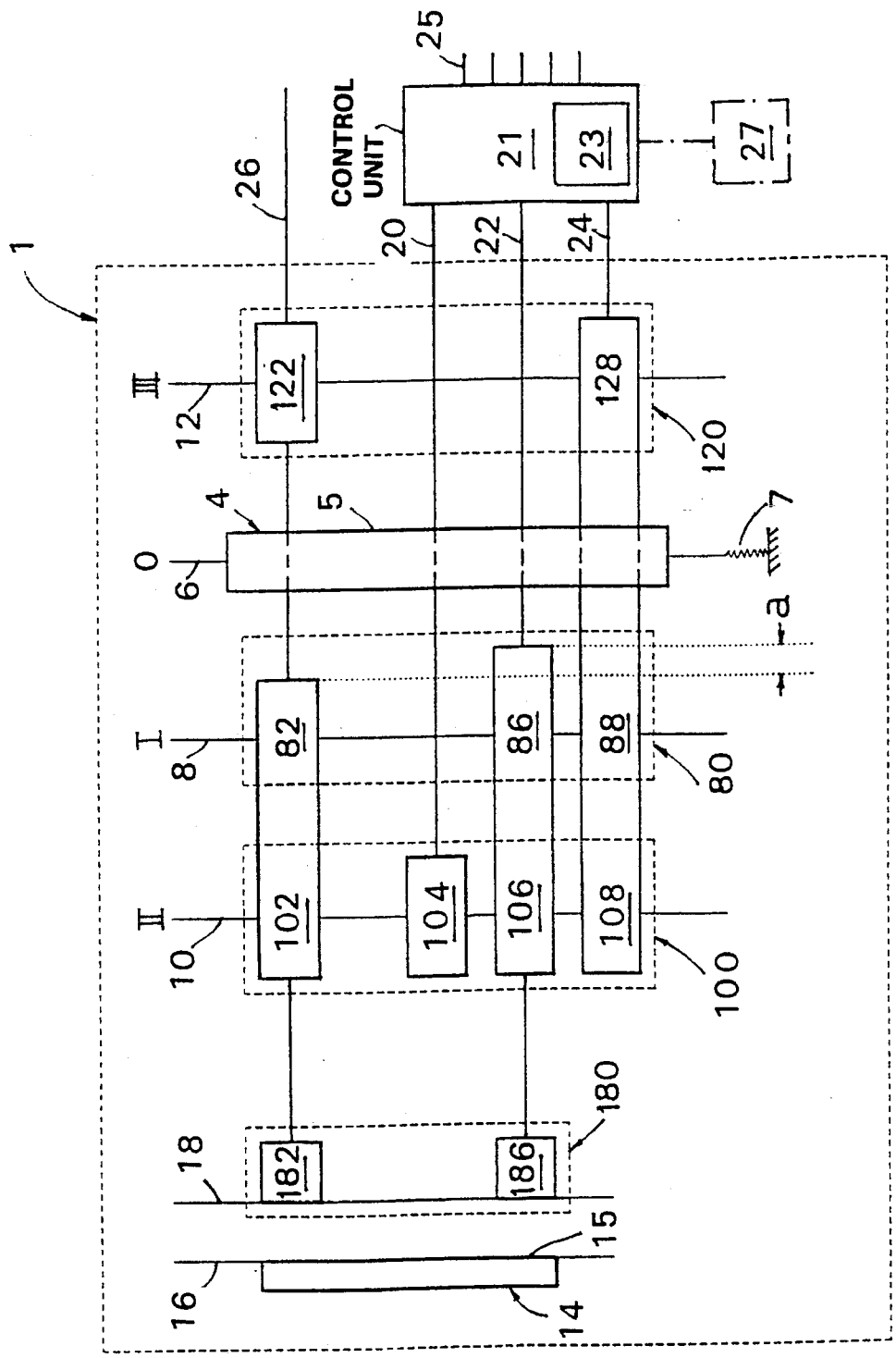
FIG. 2 shows schematically the control unit mechanism for signal transmission to the cruise control system.

FIG. 2 shows schematically the mechanism of the control unit 1 for conveying signals to the cruise control system.

It shows a contact unit 5 associated with the sliding contact 4 and a contact unit 15 associated with the push-button 14.

First, second and third signal lines 20, 22, 24 connect the control unit 1 to the cruise control system control unit 21. An incoming line 26 carries the power supply for the control unit 1 and is advantageously connected to the vehicle's electrical system 28 which serves as the source of power.

When the sliding contact 4 is in the neutral position 6, it is not connected to the incoming line 26, thus no signal can be conveyed to the control unit 21.

Moving the sliding contact 4 from the normal position 6 to the first position 8 puts the contact unit 5 in contact with a first contact device 80 containing a first contact part 82 connected to the incoming line 26, a second contact part 86 connected to the second signal line 22 and a third contact part 88 connected to the third signal line 24. Contact between the contact unit 5 and the first contact device 80 thus results in a signal being conveyed from the incoming line 26 to the control unit 21 via the second and third signal lines 22, 24. This signal gives as previously mentioned the TIP-OFF function.

As this position 8 is not an end position, the operator should get a confirmation that the position 8 has been assumed, which may for example be achieved by the sliding contact 4 cooperating in a known manner with a clicking device.

Moving the sliding contact 4 to the second position 10 analogously creates contact between the contact unit 5 and a second contact device 100 containing a first contact part 102 connected to the incoming line 26, a second contact part 104 connected to the first signal line 20, a third contact part 106 connected to the second signal line 22 and a fourth contact part 108 connected to the third signal line 24. Contact between the contact unit 5 and the second contact device 100 thus conveys a signal from the incoming line 26 to the control unit 21 via all the signal lines 20, 22, 24. As previously mentioned, the function of the signal depends on the choice of software for the control unit 21.

Finally, moving the sliding contact 4 to the third position 12 likewise analogously creates contact between the contact unit 5 and a third contact device 120 containing a first contact part 122 connected to the incoming line 26 and a second contact part 128 connected to the third signal line 24. Contact between the contact unit 5 and the third contact device 120 thus conveys a signal from the incoming line 26 to the control unit 21 via only the third signal line 24. This signal gives as previously mentioned the RESUME function.

Pressing the push-button 14 in to the position 18 creates contact between the contact unit 15 and a fourth contact device 180 containing a first contact part 182 connected to the incoming line 26 and a second contact part 186 connected to the second signal line 22. Contact between the contact unit 15 and the third contact device 180 thus conveys a signal from the incoming line 26 to the control unit 21 via the second signal line 22. This signal gives as previously mentioned the SET function.

It is advantageous for the contact unit 5 of the sliding contact 4 and the contact parts 82, 86, 88, 102, 104, 106, 108, 122, 128 of the various contact devices 80, 100, 120 to be formed as sliding contact surfaces, thereby keeping them free from oxide. This means that low currents can be permitted by the control unit 1, resulting in low effect development and consequently less heat in the control unit 21.

As shown in FIG. 2, the first contact parts 82, 102 of the first and second contact devices 80, 100 consist of a common contact surface. The same also applies to the third contact parts 86, 106 of the first and second contact devices 80, 100 and to the fourth contact parts 88, 108, 128 of the three contact devices 80, 100, 120. It also shows that moving the contact unit 5 of the sliding contact 4 to the first position 8 creates contact with the second contact part 86 before the first one 82, since the second contact part 86 has a longer extent a in the direction of the neutral position 6.

The order in which the various contact parts 82, 86, 88, 102, 104, 106, 108, 122, 128 are brought into contact with the sliding contact 4 for the desired signal to be conveyed to the control unit 21 has to be clearly defined. If, for example, the distance a was zero or negative, moving the sliding contact 4 to the first position 8 for TIP-OFF function might convey signals via only the third signal line 24 in the initial stage of the contact creation phase, which the control unit 21 would interpret as RESUME. This might result in unexpected retardation of the vehicle and simultaneous absence of the disconnection expected by the driver, which would obviously be extremely inappropriate.

This embodiment's long continuous contact surface 88, 108, 128 on the third signal line also eliminates one of the greatest conceivable safety risks, namely that signals at the time of trying to disconnect might only be conveyed via the second signal line 22, which would produce the SET function resulting in unexpected acceleration.

The embodiment described has a further advantage in the event of both the switches 4, 14 being inadvertently moved to the fight with simultaneous conveying of signals to the control unit 21 via the second and third lines 22, 24, which the control unit would interpret as TIP-OFF, i.e. a disconnecting function.

This embodiment means that critical functions which can make the vehicle accelerate can only be achieved by moving one of the switches 4, 14 to the right.

The invention also means that reaching the second position 10 involves the sliding contact 4 first passing through the first position 8 at which the cruise control system is switched off by the TIP-OFF function. The spring device 7 returns the sliding contact 4 to the neutral position after the operator action has ceased, thereby again passing through the first position 8. Thus the cruise control system is always switched off after completion of signal transmission from the second position 10 irrespective of the particular function which this position 10 has in the cruise control system.

As previously mentioned, the function of the second position 10 can be varied by changing the software of the control unit 21 according to the characteristics desired.

According to a first embodiment, the second position 10 corresponds to an ON/OFF function whereby alternate signals respectively activate the cruise control system and switch the system off with cancellation of set speed.

Such a solution has great advantages from a safety point of view and may be extremely advantageous for vehicles which often have different drivers who are unfamiliar with the system, e.g. hire vehicles.

This solution means that stopping the engine automatically switches off the cruise control system, which will thus be in the OFF position the next time the vehicle starts up.

To be able to use the system, it is therefore necessary first to move the sliding contact 4 to the second position 10, which reduces the risk of operators not familiar with the cruise control system unintentionally activating it by the push-button 14.

As the signal from the second position 10 is conveyed via all the signal lines 20, 22, 24, all of these must function for it to be possible to activate the system. If the second or third signal lines 22, 24 do not convey signals to the control unit 21 when the sliding contact it 4 is in the 360 second position 10, the control unit will interpret this as a fault in the control unit 1, making it impossible to activate the cruise control system.

According to a second embodiment, the memory unit of the control unit 21 can store a number of different set speeds if the second position 10 corresponds to a function for accessing another stored set speed where the memory is accessed according to a predetermined sequence. This means that a memory is "opened" by moving the sliding contact 4 to the second position 10. Thereafter the push-button 14 is used to set in a known manner the desired speed, which is then adopted by moving the sliding contact 4 to the third position 12 for RESUME function.

This solution is advantageous for vehicles where the operator often uses the cruise control system. It is advantageous for two set speeds to be stored in the memory unit of the control unit 21, which is accessed alternately by moving the first switch to the second position 10 repeatedly.

The sliding contact 4 has of course here too first to pass through the first position 8 at which the cruise control system is switched off by the TIP-OFF function after completion of signal transmission from the second position 10. This means that there can be no undesired acceleration when changing set speed.

This solution does however require either a third switch 27 for the ON/OFF function situated somewhere else, e.g. on the instrument panel, or an ON function resulting from the first movement of the sliding contact 4 to the second position 10 after the voltage of the control unit 1 has been set. This latter alternative involves the disadvantage that the cruise control system can only be switched off by disconnecting the power supply to the control unit 1, e.g. by stopping the engine. It is advantageous for a separate third switch to be designed so that stopping the engine automatically switches off the cruise control system, which will thus be in the OFF position the next time the cruise control system comes into operation. Here too it is the case that the signal from the second position 10 is conveyed via all the signal lines 20, 22, 24, so all of these must function for it to be possible to activate the system. If the control unit 21 of the cruise control system is provided with a diagnostic unit, the system could be automatically disconnected if the second or third signal lines 22, 24 do not convey signals to the control unit 21 when the sliding contact 4 is in the second position 10, owing to the control unit 21 interpreting this as a fault in the control unit 1.

In this second embodiment it is advantageous to provide some indication on the instrument panel so that the operator can easily obtain information about the current state of the cruise control system, such as ON/OFF, current memory, set speed, etc.

Accordingly, the invention means that the cruise control system can be adapted to various functions without having to alter the structural design of the control unit 1. As reaching the selectable second position 10 involves passing through the first position 8 at which the control unit 21 disconnects the cruise control system by the TIP-OFF function, there is no risk of unexpected acceleration, irrespective of what function the second position 10 has.

The embodiments described above may not create any limitation on the invention, which may be utilised in a multiplicity of alternative forms, e.g. the sliding contact may be replaced by a toggle switch and the design and mutual positioning of the various signal lines and contact parts may be varied infinitely so long as the control unit receives unambiguous signals.

We claim:

1. Arrangement for a cruise control system for a motor vehicle, comprising:

an electrical control unit having a memory for storing a set speed;

a plurality of input signal lines connected to the control unit, the control unit generating output signals for controlling the cruise control system in response to signals on the input signal lines;

a source of power; and a switch connected between the source of power and the input signal lines to selectively connect the source of power to the plurality of input signal lines, the switch having a neutral position, first and second operating positions spaced in a first direction from the neutral position, first and second contact units and a moveable contact moveable in the first direction from the neutral position to the first and the second positions, the first and second contact units and the moveable contact being arranged with the source of power and the input signal lines such that, when the moveable contact is in the first position, signals are applied to the input signal lines to cause the output signals from the control unit to temporarily deactivate the cruise control system without cancellation of the set speed and, in the second position, the signals applied to the input signal lines result in output signals representative of a first predetermined cruise control function being generated, the switch being further structured and arranged such that the second position can only be reached by the moveable contact first passing through the first position, so that the first contact unit applies signals via the input signal lines to the control unit as the moveable contact passes therethrough to temporarily deactivate the cruise control system.

2. Arrangement according to claim 1, wherein the first and second contact units are disposed at the first and second positions, respectively.

3. Arrangement according to claim 1, further including a second switch connected between the source of power and the signal lines for applying signals to the signal lines so that the control unit generates output signals representative of a desired speed.

4. Arrangement according to claim 3, in which each of the contact units includes contact parts in the form of sliding surfaces which respectively make contact with the sliding surface of the moveable contact.

5. Arrangement according to claim 1, wherein the moveable contact is a sliding contact.

6. Arrangement according to claim 1, wherein a plurality of set speeds may be stored in the memory so that, when the cruise control system has been activated to operate at one of the set speeds stored in the memory and the moveable contact is thereafter moved to the second position, signals are applied to the input signal lines to cause output signals to be generated from the control system which cause the cruise control system to operate at another of the set speeds stored in the memory, the control unit accessing the set speeds stored in the memory according to a predetermined sequence.

7. Arrangement according to claim 6, wherein the memory unit can store two different set speeds.

8. Arrangement according to claim 6, further including a third switch for deactivating the cruise control system.

9. Arrangement according to claim 8, wherein there are three signal lines.

10. Arrangement for a cruise control system for a motor vehicle, comprising:

an electrical control unit having a memory for storing a set speed;

a plurality of input signal lines connected to the control unit, the control unit generating output signals for controlling the cruise control system in response to signals on the input signal lines;

a source of power; and a switch connected between the source of power and the input signal lines to selectively connect the source of power to the plurality of input signal lines, the switch having a neutral position, first and second operating positions spaced in a first direction from the neutral position, first and second contact units disposed at the first and second positions, respectively, and a moveable contact moveable in the first direction from the neutral position to the first and the second positions, the first and second contact units and the moveable contact being arranged with the source of power and the input signal lines such that, when the moveable contact is in the first position, signals are applied to the input signal lines to cause the output signals from the control unit to temporarily deactivate the cruise control system without cancellation of the set speed and, in the second position, the signals applied to the input signal lines result in output signals representative of a first predetermined cruise control function being generated, the switch being further structured and arranged such that the second position can only be reached by the moveable contact first passing through the first position, so that the first contact unit applies signals via the input signal lines to the control unit as the moveable contact passes therethrough to temporarily deactivate the cruise control system, the switch further including a third operating position spaced in a second direction from the neutral position and a third contact unit disposed at the third position, the moveable contact being moveable in the second direction to the third operating position, and the third contact unit being arranged with the moveable contact the source power and the input signal lines such that, when the moveable contact is in the third position, signals are applied to the input signal lines which result in output signals representative of a second predetermined cruise control function being generated by the control unit.

11. Arrangement according to claim 10, wherein at least one spring device is provided for urging the movable contact towards the neutral position so that, when a force is applied to the moveable contact to move it to the first, second and third positions, the moveable contact moves against the action of the spring device and, when the force is removed, the spring device returns the moveable contact to the netural position.

12. Arrangement according to claim 11, wherein the source of power is an electrical system of the vehicle.

13. Arrangement according to claim 12, wherein when the switch is in the second position a signal is applied to each of the signal lines.

14. Arrangement for a cruise control system for a motor vehicle, comprising:

an electrical control unit having a memory for storing a set speed;

a plurality of input signal lines connected to the control unit, the control unit generating output signals for controlling the cruise control system in response to signals on the input signal lines;

a source of power; and a switch connected between the source of power and the input signal lines to selectively connect the source of power to the plurality of input signal lines, the switch having a neutral position, first and second operating positions spaced in a first direction from the neutral position, first and second contact units and a moveable contact moveable in the first direction from the neutral position to the first and the second positions, the first and second contact units and the moveable contact being arranged with the source of power and the input signal lines such that, when the moveable contact is in the first position, signals are applied to the input signal lines to cause the output signals from the control unit to temporarily deactivate the cruise control system without cancellation of the set speed and, in the second position, the signals applied to the input signal lines result in output signals representative of a first predetermined cruise control function being generated, the switch being further structured and arranged such that the second position can only be reached by the moveable contact first passing through the first position, so that the first contact unit applies signals via the input signal lines to the control unit as the moveable contact passes therethrough to temporarily deactivate the cruise control system, the first cruise control function being an ON/OFF function so that alternate movements of the moveable contact to the second position respectively activate and deactivate the cruise control system, deactivation of the cruise control system in the second position effecting a cancellation of the set speed stored in memory.

15. Arrangement according to claim 14, wherein the second cruise control function is adoption of the set speed stored in memory.

16. Arrangement according to claim 14, wherein after a set speed is stored in memory, movement of the moveable contact to the second position causes signals to be applied to the signal line which result in activation of the cruise control system.

* * * * *